(12) United States Patent
Selegean (10) Patent No.: US 10,951,738 B1
(45) Date of Patent: Mar. 16, 2021

(54) AUTOMATIC API INTEGRATION

(71) Applicant: Bank of America Corporation, Charlotte, NC (US)

(72) Inventor: Jane Selegean, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/986,811

(22) Filed: Aug. 6, 2020

(51) Int. Cl.
*G06F 9/54* (2006.01)
*H04L 29/06* (2006.01)

(52) U.S. Cl.
CPC .............. *H04L 67/40* (2013.01); *G06F 9/547* (2013.01)

(58) Field of Classification Search
CPC ...................................................... G06F 9/541
See application file for complete search history.

(56) References Cited

U.S. PATENT DOCUMENTS

| | | |
|---|---|---|
| 6,236,997 B1 | 5/2001 | Bodamer et al. |
| 7,051,068 B1 | 5/2006 | Kawase et al. |
| 7,512,954 B2 | 3/2009 | Srivastva et al. |
| 7,584,241 B2 | 9/2009 | Kureshy et al. |
| 7,685,235 B2 | 3/2010 | Curran et al. |
| 7,895,579 B2 | 2/2011 | Guerrera et al. |
| 8,229,440 B2 | 7/2012 | Yoon et al. |
| 8,230,417 B1 | 7/2012 | Clark et al. |
| 8,234,372 B2 | 7/2012 | Knapp et al. |
| 8,347,214 B2 | 1/2013 | Dillon et al. |
| 8,407,190 B2 | 3/2013 | Prahlad et al. |
| 8,490,188 B2 | 7/2013 | Kandek et al. |
| 8,510,762 B1 | 8/2013 | Gregorio et al. |
| 8,798,634 B2 | 8/2014 | Yoon et al. |
| 8,849,761 B2 | 9/2014 | Prahlad et al. |
| 8,893,077 B1 | 11/2014 | Aiuto et al. |
| 9,027,000 B2 | 5/2015 | Guerrera et al. |
| 9,053,238 B2 | 6/2015 | Krishnan et al. |
| 9,171,008 B2 | 10/2015 | Prahlad et al. |
| 9,258,322 B2 | 2/2016 | Kandek et al. |
| 9,454,537 B2 | 9/2016 | Prahlad et al. |
| 9,471,405 B1 | 10/2016 | Mor |
| 9,621,594 B2 | 4/2017 | Kandek et al. |
| 9,916,455 B2 | 3/2018 | Kandek et al. |
| 10,080,169 B2 | 9/2018 | Yoon et al. |
| 10,248,657 B2 | 4/2019 | Prahlad et al. |
| 10,249,073 B2 | 4/2019 | Wald et al. |
| 10,484,337 B2 | 11/2019 | Subbarayan et al. |
| 10,528,759 B2 | 1/2020 | Kujawski |

(Continued)

*Primary Examiner* — Brian W Wathen
(74) *Attorney, Agent, or Firm* — Michael A. Springs (57) ABSTRACT

A target device executes a target application programming interface (API), and a client device executes a client API that generates and/or collects data. The client device determines that at least a portion of the data collected by the client API is to be sent from the client API to the target API. In response to this determination, target configuration information is received. The target configuration information includes one or both of software properties of software executed on the target device and hardware properties of the target device. The client device determines that a data transfer change is needed for receipt of the portion of the data by the target API. In response to determining that the data transfer change is needed, the data transfer change is automatically implemented. The portion of the data is then sent to the target API.

20 Claims, 4 Drawing Sheets

(56) References Cited

U.S. PATENT DOCUMENTS

| | | | |
|---|---|---|---|
| 2003/0217044 A1* | 11/2003 | Zhang | G06F 9/546 |
| 2007/0027904 A1 | 2/2007 | Chow et al. | |
| 2007/0234285 A1 | 10/2007 | Mendoza et al. | |
| 2011/0247016 A1 | 10/2011 | Seong | |
| 2012/0276880 A1 | 11/2012 | Angorn et al. | |
| 2016/0352867 A1 | 12/2016 | Subbarayan et al. | |
| 2018/0204010 A1 | 7/2018 | Kandek et al. | |
| 2018/0232404 A1* | 8/2018 | Bhatti | G06F 9/541 |
| 2018/0314622 A1 | 11/2018 | Lowe et al. | |
| 2018/0314750 A1 | 11/2018 | Merriman et al. | |
| 2018/0357114 A1* | 12/2018 | O'Kennedy | G06F 9/547 |
| 2019/0179805 A1 | 6/2019 | Prahlad et al. | |
| 2019/0196935 A1 | 6/2019 | Edwards et al. | |
| 2020/0097338 A1* | 3/2020 | Dhondse | G06F 11/3495 |
| 2020/0162433 A1 | 5/2020 | Subbarayan et al. | |
| 2020/0410386 A1* | 12/2020 | Loving | G06K 9/6218 |

* cited by examiner

AUTOMATIC API INTEGRATION

TECHNICAL FIELD

The present disclosure relates generally to data exchange and software programming, more specifically to automatic API integration.

BACKGROUND

Information may be communicated between applications using an application programming interface (API). An API provides an interface for communication of information between different software types, such as applications, operating systems, and other services.

SUMMARY

In one embodiment, a system includes a target device, which has a processor configured to execute a target application programming interface (API). The system also includes a client device with a processor configured to execute a client API, wherein the client API is configured to collect data from a data source. The processor determines that at least a portion of the data collected by the client API is to be sent from the client API to the target API. In response to determining that the portion of the collected data is to be sent from the client API to the target API, target configuration information is received. The target configuration information includes one or both of software properties of software executed on the target device and hardware properties of the target device. The software properties are associated with one or more tasks to be performed by the target API. The hardware properties include a measure of computational resources allocated to the target API. The processor determines, based on the target configuration information, that a data transfer change is needed for receipt of the portion of the data by the target API. The data transfer change may include one or more of a change to the portion of data to be transferred, a configuration of the client API, and a configuration of the target API. In response to determining that the data transfer change is needed for receipt of the portion of the data by the target API, the data transfer change is automatically implemented. Following implementation of the data transfer change, the portion of the data is sent to the target API.

API integration involves coordination between different APIs (e.g., of different applications) and the sharing of information between the different APIs. Successful API integration generally requires that a target API (e.g., a counterparty of a client API) has an appropriate software and hardware configuration for data to be received and used by the target API. For example, appropriate data synchronization and format settings may need to be established for transfer of data between a client API and a target API. Previous technology typically involves extensive development and testing (e.g., using development sandboxes) to perform API integration. Previous technology can be inefficient and can prevent desired integrations from being implemented in a practical timescale because of the long development times and inefficient use of resources for testing.

Certain embodiments of this disclosure provide unique solutions to technical problems of previous API integration technology, including those problems identified above. For example, the disclosed systems provide several technical advantages over previous technology, which include: 1) the automatic integration of a client and target APIs without requiring extensive testing and development; 2) more reliable and efficient integration of APIs for transfer of data from a client to a target API; and 3) more efficient use of computing resources (e.g., processing, memory, and/or network resources) to perform API integration. As such, this disclosure may improve the function of computer systems used to integrate APIs from different applications such that information may be shared between the different applications. For example, the system described in this disclosure check the configuration of a target (e.g., target hardware and/or software properties) and make appropriate adjustments at the client and/or target to ensure efficient and reliable transfer of data. For instance, a data transfer language may be adjusted, the partitioning of data into API calls may be adjusted, and/or computing resources allocated to the client API and/or target API may be adjusted. The system may also or alternatively reduce or eliminate practical and technical barriers to integrating large numbers of APIs in a practical time span (e.g., without expending large amounts of time and resources on testing and development). The systems described in this disclosure may particularly be integrated into a practical application of an API integration system, which performs automated API integration by checking target configuration, identifying appropriate changes to the target configuration needed for successful API integration, and causing these changes to be implemented before data transfer is initiated.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
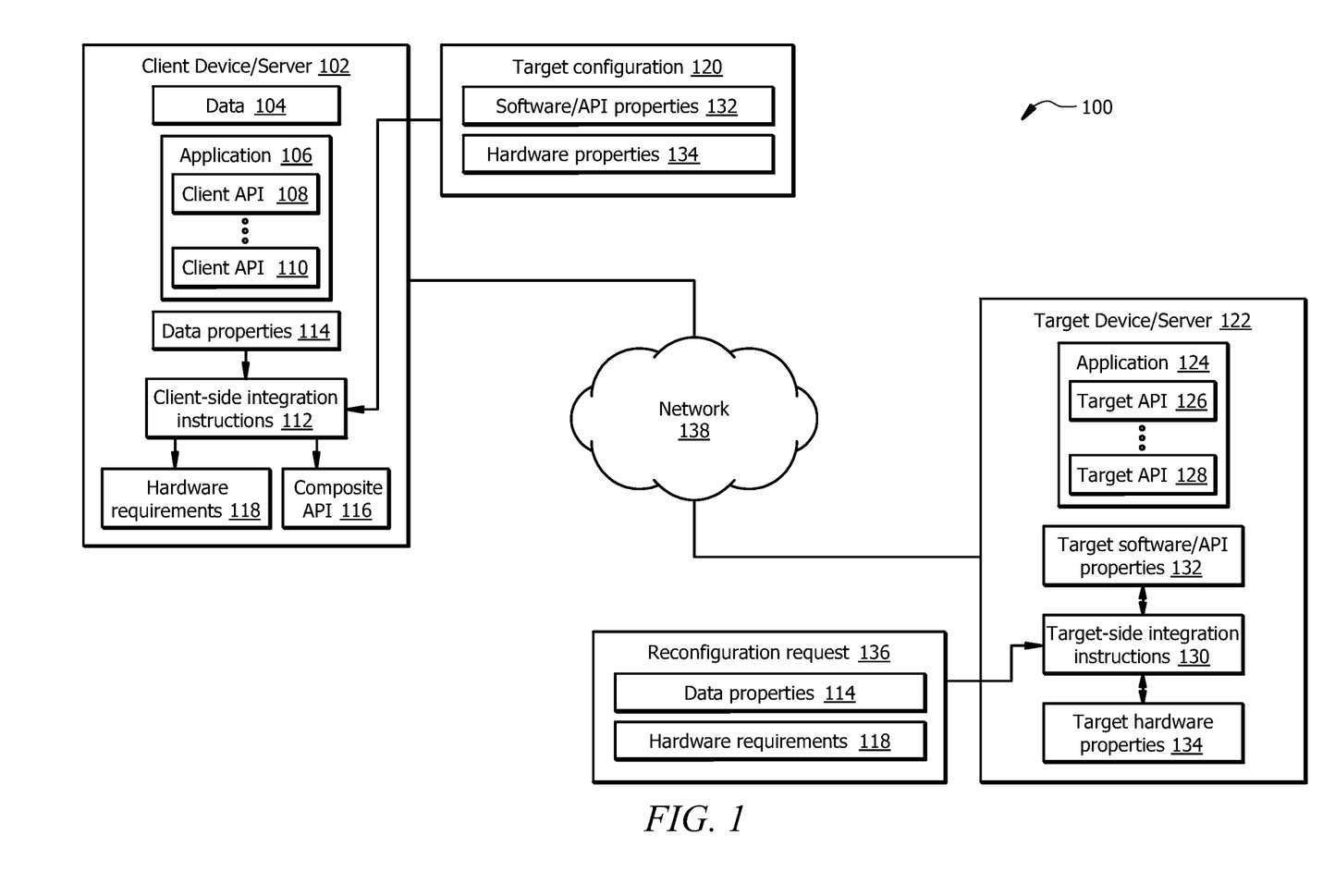
FIG. 1 is a schematic diagram of an example system for automatic API integration.
Figure 2:
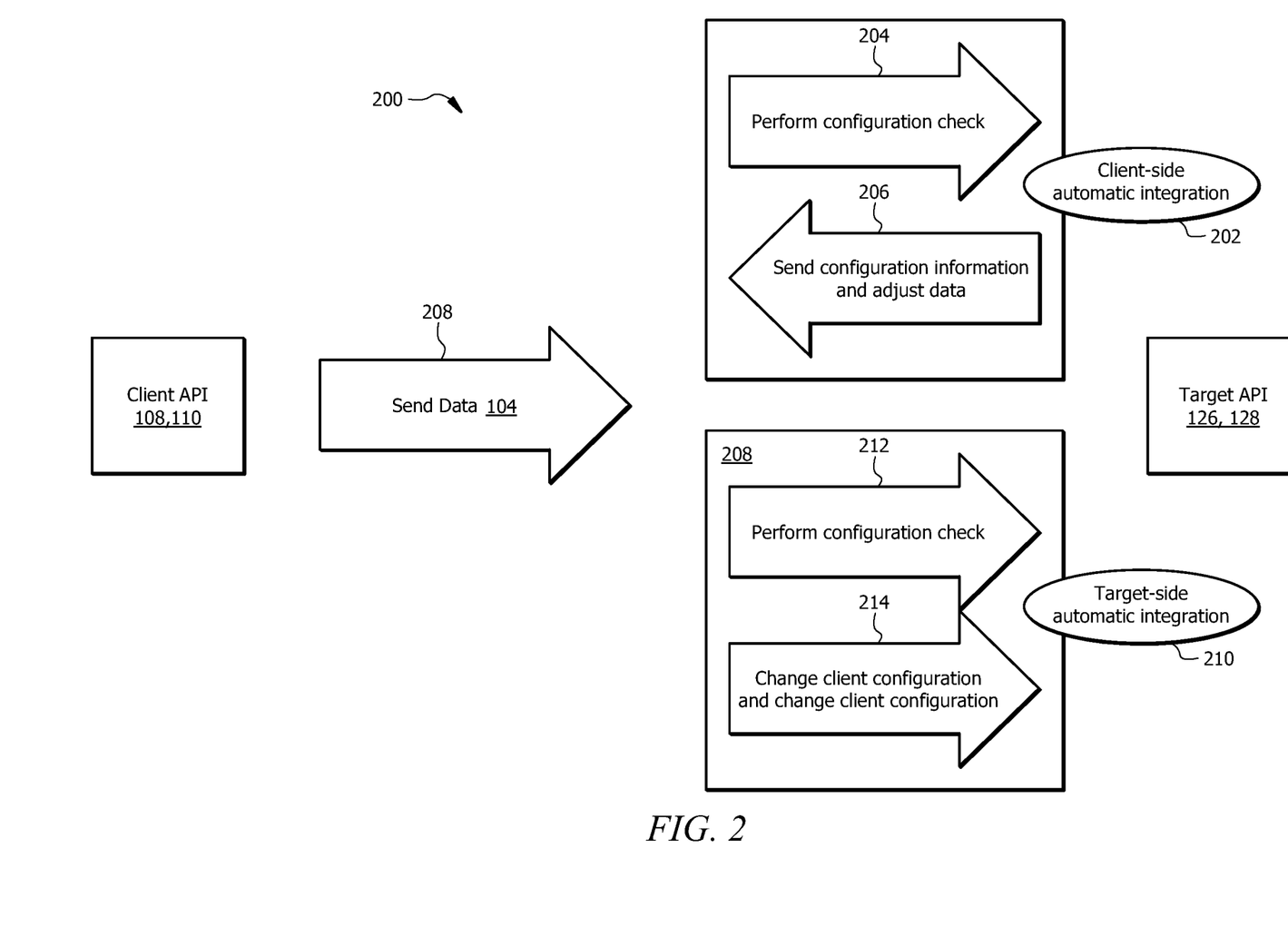
FIG. 2 is a flow diagram illustrating examples of data reconfiguration and target reconfiguration for automatic API integration in the system of FIG. 1.
Figure 3:
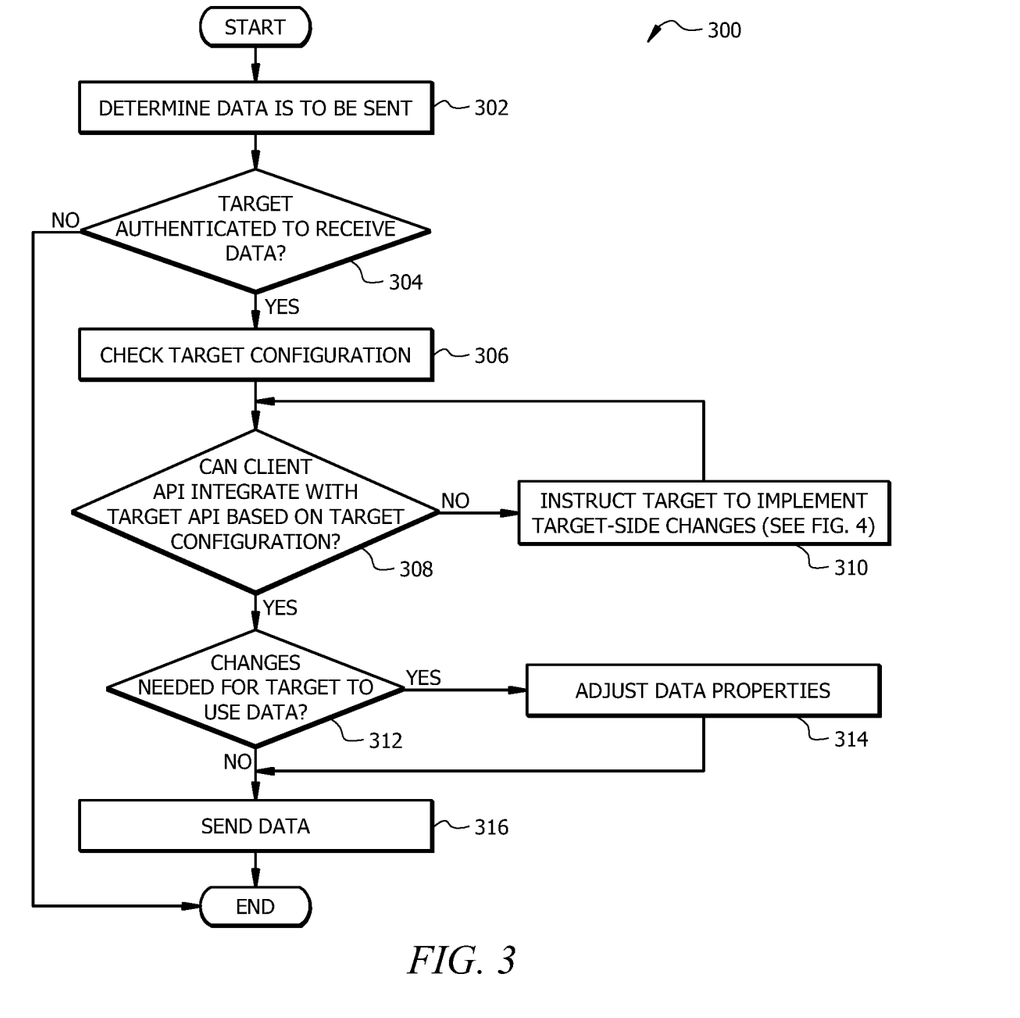
FIG. 3 is a flowchart of a method for facilitating automatic API integration using the client-side integration instructions of FIG. 1.
Figure 4:
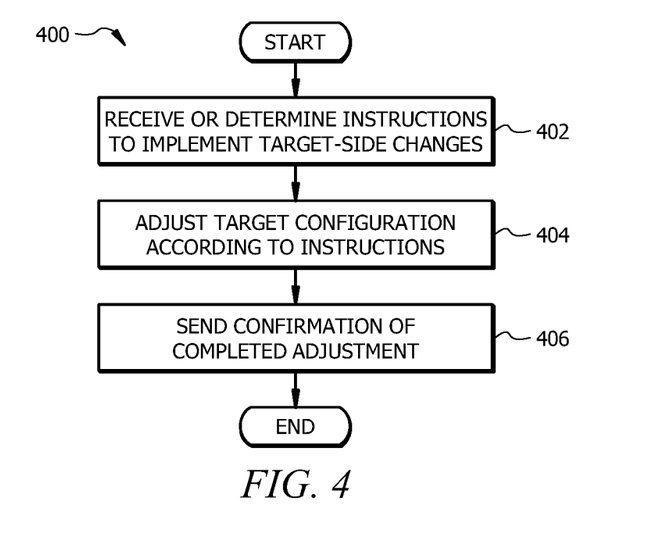
FIG. 4 is a flowchart of a method for facilitating automatic API integration using the target-side integration instructions of FIG. 1.
Figure 5:
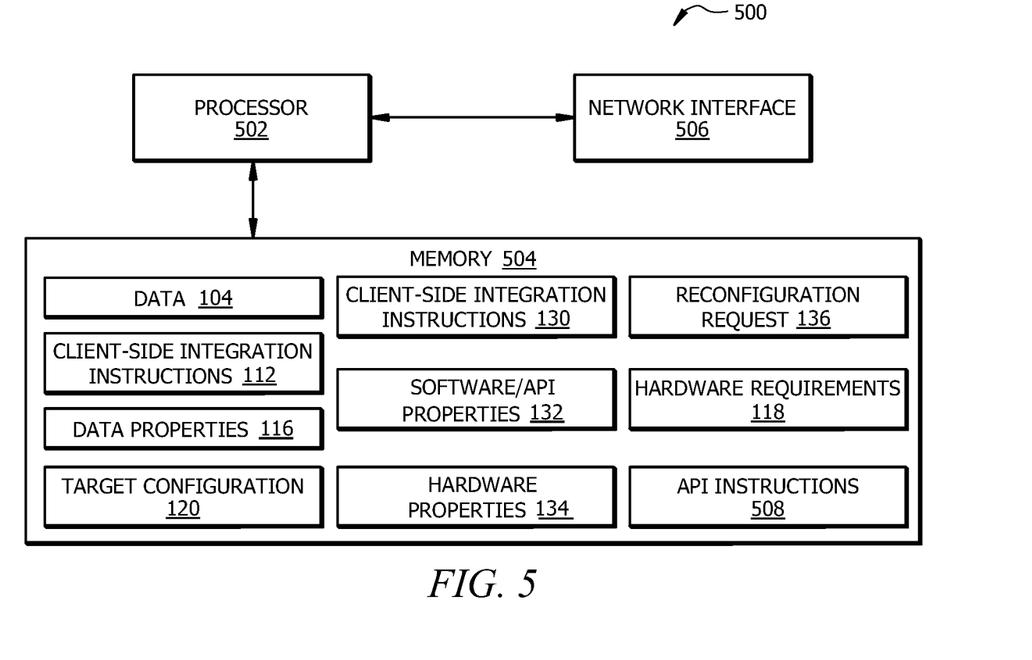
FIG. 5 is a diagram of an example device configured to implement various components of the system of FIG. 1.

Previous technology lacks tools for efficient and reliable automated API integration. For example, previous approaches relying on trial and error and resource-intensive testing result in slow development and inefficient use of the computing resources used for testing and development. This disclosure provides a new approach to API integration by automatically adjusting one or more of the data being transmitted (e.g., format, data transfer language), the properties of data transmission (e.g., the number of API calls in which data is transmitted), properties of the client API and/or an associated device (e.g., the amount of computing resources available to the client API and/or a client device), and/or properties of the target API and/or an associated device (e.g., the amount of computing resources available to the target API and/or a target device). FIG. 1 illustrates a system for integration between a client API and a target API. The flow diagram of FIG. 2 illustrates examples of data and/or target reconfiguration for automatic API integration in the system of FIG. 1. FIG. 3 illustrates a client-side method for sending data from a client API to a target API. FIG. 4 illustrates a target side method of reconfiguring the target device and/or target API for automatic API integration. FIG. 5 illustrates an example device for implementing the various components of the system of FIG. 1.

Event Detection and Data Integration System

FIG. 1 is a schematic diagram of an example system 100 for API integration. The system 100 generally facilitates the efficient automatic integration of client APIs 108, 110 and target APIs 126, 128. The system 100 includes one or more client devices 102, one or more target device 122, and a network 138. As described in greater detail below with respect to FIGS. 2-4, the system 100 generally facilitates the automatic integration of APIs 108, 110 and 126, 128 such that data 104 may be efficiently communicated between application 106 and 122. In the example of FIG. 1, application 106 is executed on a target device 102, and the application 124 is executed on a separate target device 122. In other embodiments, the applications 106, 124 may be executed on the same device (e.g., both applications 106, 124 may be executed on device 102). One or both of the client-side integration instructions 112 and the target-side integration instructions 130 may be used to facilitate improved integration between client APIs 108, 110 and target APIs 126, 128, as described further below.

Client-side integration instructions 112 and target-side integration instructions 130 include code, logic, and/or rules for implementing changes to the data 104, the method of communicating the data 104, and/or the configuration 120 of the target device 122 for receiving the data 104. For example, in some embodiments, client-side integration instructions 112 generate a composite API 116 which is configured to efficiently communicate the data 104 to the target application 124, such that the data 104 is usable by the target APIs 126, 128. In some embodiments, client-side integration instructions 112 are used to check the configuration 120 of the target device 122 (e.g., the software properties and/or hardware properties 134 of the target device 122) and determine if the target configuration 120 is compatible with receiving and using the data 104 that is to be communicated. If the configuration 120 is not compatible with the data 104, the client-side integration instructions 112 may cause the data 104 to be appropriately adjusted (e.g., by changing format, data transfer language, API call configuration, and the like of the data 104) and/or by sending a request 136 for the target device 122 to perform some reconfiguration such that the data 104 can be communicated and used by the device 122.

The target-side integration instructions 130 may facilitate automatic changes to the configuration 120 of the target device 122 in order for the data 104 to be efficiently and reliably received and used (e.g., manipulated and/or displayed) by the target device 122. For example, in some embodiments, target-side integration instructions 130 may automatically adjust the configuration of the target device 122 based on the properties 114 of the data 104 (e.g., size of file(s) associated with the data 104, transfer rate of the data 104, format of the data 104, data transfer language used to send the data 104, and the like) and/or the hardware requirements 118 of the data 104 (e.g., the computing resources associated with the communication and/or use of the data 104). For instance, the target-side integration instructions 130 may automatically requisition additional processing resources to perform anticipated tasks (e.g., data manipulations and/or data presentations) using the data 104 by the target API 126, 128 and/or target device 122.

The client device 102 may be any computing device or collection of computing devices (e.g., a collection of devices implemented as a server). An example of a device for implementing the device 102 is shown in FIG. 5 and described in greater detail below. The client device 102 generally accesses or stores data 104, which is to be transferred to the target application 124 (e.g., to one or more of the target APIs 126, 128). For example, the data 104 may be collected and/or generated by an application 106 executed on the client device. The data 104 may include information stored in any appropriate format. The application 106 may be any application or service executed by the client device 102. For example, the application 106 may be software that monitors and/or collects data 104 from a data source (e.g., a database, a data stream, or the like). The application 106 may maintain a record of information over time, and all or a portion of this record may be included in the data 104. As another example, the application 106 or another service associated with the client device 102 may receive or collect the data 104 from an external source. For instance, the data 104 may be originally stored on the client device 102 or obtained from another data source, such as a database, data warehouse, or the like (not shown for clarity and conciseness). While the example of FIG. 1 shows a single application 106, it should be understood that application 106 may represent multiple applications executed at the client device 102.

The application 106 may include one or more APIs 108, 110 which act as interfaces for communicating the data 104 from the application 106 to the target application 124 of the target device 122, described further below. The APIs 108, 110 may be any type of API (e.g., Open APIs, Partner APIs, Internal APIs, Composite AOPIs, or Web Service APIs). The APIs 108, 110 may initially be configured to communicate with other devices, applications, and/or APIs. However, as software and hardware are changed over time and/or as new applications are implemented, communication between the APIs 108, 110 and other applications, APIs, and/or devices may become inefficient or unreliable, or may otherwise fail. Previous technology generally fails to anticipate such problems and typically requires specially trained developers to perform extensive troubleshooting, testing, and reprogramming once communication failures between APIs are eventually detected. These problems of previous technology are overcome in this disclosure by the client-side integration instructions 112 and/or the target-side instructions 130 (described further below), which facilitate the efficient and reliable identification of possible communication inefficiencies and/or failures and the automatic adjustments to the data 104 to be communicated (e.g., changes to data format and/or communication programming language, etc.) and/or to the configuration 120 of the target device 122 (e.g., to the software properties 132 and/or hardware properties 134 of the target device 122).

For example, the client-side integration instructions 112 may include logic, code, and/or rules for checking the configuration 120 (e.g., how the software and hardware of the target device 122 are configured) of the target device 122 and appropriately adjusting the data 104 or the method of communicating the data 104 such that the data 104 can be received and used by the target application 124. For example, client-side integration instructions 112 may collect or receive properties 132 of the software/APIs 126, 128 of the target device 122 and use this information to determine a data transfer language for reliably transferring the data 104. For instance, the client-side integration instructions 112 may determine that the target API 126, 128 is configured to receive data in JavaScript object notation (JSON), but the client API 108, 110 may be configured to receive information using extensible markup language (XML). In such cases, the client-side integration instructions 112 may adjust the client API 108, 110 such that it transfers the data 104 using JSON rather than XML.

As another example, the client-side integration instructions 112 may collect or receive properties 134 of the hardware of the target device 122 or the computing resources allocated to target APIs 126, 128 and use this information to adjust how the data 104 is communicated to the target device. For example, the client-side integration instructions 112 may determine that the data 104 should be sent in a certain number of segments or packets of a predefined file size (e.g., in a certain number of API calls) and/or at a certain data transfer rate that is commensurate with the data processing, memory, and/or network bandwidth properties of the target device 122 and/or target API 126, 128. As yet another example, the client-side integration instructions 112 may determine that additional computing resources are needed by the client device 102 and automatically requisition these resources (e.g., additional compute nodes) to the device 102.

In some cases, the client-side integration instructions 112 may send the target device 122 a request 136 to reconfigure the software and/or hardware of the target device 122 (e.g., to adjust the target configuration 120). For example, the request 136 may include the data properties 114, which may be used by the target-side integration instructions 130 to adjust the software properties 132 of the target device 122 in order for the data 104 to be reliably and inefficiently received, manipulated and/or presented. The request 136 may also or alternatively include hardware requirements 118, determined by the client-side integration instructions 112, which include the computing resources (e.g., processing, memory, network bandwidth, etc.) needed to reliably receive, manipulate, and/or present the data 104. The client-side integration instructions 130 may use the hardware requirements 118, for example, to automatically requisition new computing resources and/or adjust available computing resources in order to at least meet the hardware requirements 118. For example, the computing resources allocated to the target API 126, 128 may be increased to satisfy the hardware requirements 118. Further details and examples of using the client-side integration instructions 112, used alone or in combination with the target-side integration instructions 130 (described further below), to facilitate API integration are described in greater detail below with respect to FIGS. 2-4.

The target device 122 may be any computing device or collection of computing devices (e.g., a collection of devices implemented as a server). An example of a device for implementing the target device 122 is shown in FIG. 5 and described in greater detail below. The target device 122 generally executes an application 124 to which data 104 is to be sent. For example, application 124 may provide for the visualization, manipulation, and/or other use of at least a portion of the data 104. While the example of FIG. 1 shows a single application 124, it should be understood that application 124 may represent multiple applications executed at the target device 122. Similar to the application 106 described above, application 124 may include one or more APIs 126, 128 which act as interfaces for receiving data 104 and facilitating use of the data 104 by the application 104. The APIs 126, 128 may be any type of API (e.g., Open APIs, Partner APIs, Internal APIs, Composite APIs, or Web Service APIs). Similarly to APIs 108, 110 described above, APIs 126, 128 may initially be configured to communicate with other devices and applications. However, communication between the APIs 126, 128 and other applications and/or devices may become inefficient and/or unreliable over time and/or when new applications are introduced. These problems of previous technology may be overcome by the target-side instructions 130, which facilitate the efficient and reliable identification of possible communication inefficiencies and/or failures and the automatic adjustment of the configuration 120 of the target APIs 126, 128 and/or the target device 122 (e.g., to the software properties 132 and/or hardware properties 134 of the target device 122).

For example, the target-side instructions 130 may include logic, code, and/or rules for checking the configuration 120 (e.g., how the software and hardware of the target device 122 are configured) of the target device 122 and/or the target APIs 126, 128 and appropriately adjusting the properties 132 of the software/API properties 132 for using data 104 and/or the properties 134 of the hardware (e.g., the computing resources and configuration of these resources) of the target device 122 and/or target APIs 126, 128. For example, the target-side instructions 130 may determine, based on the properties 132 of the software/API properties 132, an appropriate data transfer language (e.g., JSON, XML, or the like) for receiving the data 104 and automatically cause this data transfer language to be used by the target API 126, 128. As another example, the target-side instructions 130 may determine, based on the properties 134 of the hardware of the target device 122 and/or hardware requirements 118 (e.g., provided in a request 136), that additional computing resources are needed to efficiently and reliably receive, manipulate, and/or present the data 104. These changes to the hardware properties 134 (e.g., adding computing nodes or the like) may automatically be implemented (e.g., by requisitioning additional computing nodes or the like). As yet another example, the target-side integration instructions 130 may automatically cause the data 104 to be exposed (e.g., presented or otherwise visualized) in a predefined format for the data type. As an illustrative example, date entries may automatically be presented in a preferred format (e.g., as "MONTH/DAY/YEAR" instead of "DAY/MONTH/YEAR"), names of individuals may be automatically obscured, and the like. Further details and examples of using the target-side integration instructions 130 to facilitate API integration are described in greater detail below with respect to FIGS. 2 and 4.

Network 138 facilitates communication between and amongst the various components of the system 100. This disclosure contemplates network 138 being any suitable network operable to facilitate communication between the components of the system 100. Network 138 may include any interconnecting system capable of transmitting audio, video, signals, data, messages, or any combination of the preceding. Network 138 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100, a target API 126, 128 acts as an application "landing zone," where data 104 from the client API 108, 110 is integrated and used (e.g., analyzed and/or displayed). Data 104 is to be communicated between the client API 108, 110 and the target API 126, 128. Previous technology generally requires extensive testing, which consumes computing resources to execute sandboxes and the like, and developer knowledge to integrate the client API 108, 110 and target API 126, 128. This previous approach is inefficient and can be a bottleneck to the implementation of new APIs and/or the repurposing of existing APIs (e.g., where computing and development resources are limited). The API integration system 100 overcomes these challenges using the unique integration approaches provided by the client-side instructions 112 and target-side instructions 130 to effectively automate integration testing and execute on actions to perform API integration. Automated feedback may be provided to a developer if automated API integration is not successful.

FIG. 2 is a flow diagram 200 illustrating the automatic integration of these APIs 108, 110 and 126, 128. A client-side integration 202 may be performed using the client-side integration instructions 112. During client-side integration 202, the client-side integration instructions 112 perform a configuration check 204 of the software/API properties 132 and hardware properties 134 of the target device 122 (see description of software/API properties 132 and hardware properties 134 above with respect to FIG. 1) in order to determine whether the target API 126, 128 is capable of handling receipt and/or performing desired subsequent tasks using the data 104. For example, the client device 102 may request the configuration 120 of the target device 122 and/or scan the target device 122 and/or target APIs 126, 128 to identify the target software/API properties 132 and/or the target hardware properties 134. For example, the client-side integration instructions 112 may cause the client device 102 to request data transfer language(s) used by the target APIs 126, 128, the amount of processing resources allocated to the target APIs 126, 128, information about tasks performed by the target APIs 126, 128 (e.g., how the data 104 is used by the target device 122 to display, analyze, and/or manipulate the data 104 using APIs 126, 128), and the like.

The target configuration 120 is sent 206 to (e.g., or is received by) the client device 102. The client-side integration instructions 112 may use the target configuration 120 to adjust how the data 104 is transferred to the target APIs 126, 128. For example, client-side integration instructions 112 may adjust the data transfer language used by the client API 108, 110 (e.g., to match the data transfer language used by the target API 126, 128). The client-side integration instructions 112 may adjust how the data 104 is sent to the target device 122 (e.g., based on hardware properties 134 of the target device 122 and/or the computing resources allocated to the target API 126, 128). For instance, the client-side integration instructions 112 may determine whether the data 104 can be transferred in a single API call. If more than one API call is needed to transfer the data 104, the client-side integration instructions 112 may send the data 104 in two or more calls. In some cases, the client-side integration instructions 112 may determine that additional computing resources (e.g., processing nodes, memory, or the like) would facilitate increased data transfer efficiency and, in response to this determination, automatically adjust the computing resources allocated to the client APIs 108, 110 to provide more efficient and/or reliable data transfer. In cases whether there are multiple client APIs 108, 110 from which data 104 is to be transferred to the target API 126, 128, the API calls needed for this transfer may be automatically compiled to generate a composite API 116. This composite API may subsequently be used for transfer of data 104 to the target API 126, 128.

Still referring to the above example operation of the system 100, a target-side integration 210 may be performed using the target-side integration instructions 130. The target-side integration instructions 130 may also involve a configuration check 212, which is similar to the configuration check 204 described above. The configuration check 212 may include a determination of the target configuration 120, the data properties 114, and/or the hardware requirements 118. As described above, the data properties 114 (e.g., the type and amount of information included in the data 104 to be sent) and the hardware requirements 118 (e.g., the necessary computing resources to transfer and use the data 104 by the target APIs 126, 128) may be provided from the client-side integration instructions 112. Alternatively, one or both of the data properties 114 and hardware requirements 118 may be determined by the target-side integration instructions 130.

The client-side integration instructions 112 and the target-side integration instructions 130 may operate in combination to provide increased efficiency and an improved user experience. For example, the client-side integration instructions 112 may check the target configuration 120 and determine based, for example, on the software/API properties 132, an anticipated task to be performed using the data 104 by the target API 126, 128 or target application 124. For example, the software/API properties 132 may indicate that the target application 124 includes code for analyzing portions of the data 104 and presenting a graphical representation of the result of this analysis as the data 104 is received. If the target device 122 lacks sufficient computing resources to perform these tasks at the rate at which the data 104 is to be transferred, one or both of the following may be performed: 1) additional computing resources may be provisioned to the target device 122 and/or the target API 126, 128, and/or 2) the rate of data transfer from the client API may be decreased such that fewer computing resources are needed at the target device 122 to perform the anticipated task(s).

In another example operation of the system 100 of FIG. 1, the target-side integration instructions 130 act alone (e.g., without changes to the client API 108, 110) to integrate data 104 from a client API 108, 110 that is from a public source, is from an open-sourced API library (e.g., a collection of APIs that transfer data from another application), or is hosted on an API gateway. The target-side integration instructions 130 may automate integration testing. For example, the target-side instructions 130 may determine the configuration 120 of the target device 122 and/or target APIs 126, 128, determine the data properties 114, determine hardware requirements 118 (e.g., based on the data properties 114), determine whether the target configuration 120 satisfies the hardware requirements 118, and execute any changes needed for the target configuration 120 to satisfy the hardware requirements 118.

In some cases, the target-side integration instructions 130 may automatically present information about the data 104 in a predetermined format (e.g., that corresponds to a predefined user setting). For instance, the data 104 may be mapped such that, when the APIs 108, 110 and 126, 128 are successfully integrated, a front-end of the application 124 may display a visual representation of the mapping with an appearance determined by the predefined user settings. As another example, portions of the data 104 may be presented in the application 124 in a predefined format (e.g., with a preferred date format, with first and/or last names obscured, etc.).

In another example operation of the system 100 of FIG. 1, the client API 108, 110 is a composite API, which batches requests from multiple sources. The target-side integration instructions 130 may identify the various data sources associated with the single composite API and subsequently adjust the data transfer language and/or number of calls used to collect the data 104 based on properties of the data sources (e.g., the type of data provided by the data sources, the data transfer languages used by the data sources, and the like).

In yet another example operation of the system 100 of FIG. 1, the client API 108, 110 is a REST API (e.g., a live data-streaming web service API) which connects to a data stream. If the client-side integration instructions 112 detect that the hardware configuration of the target device 122 and/or target API 126, 128 is incompatible with such a REST client API 108, 110 (e.g., because the client API 108, 110 needs an increased level of computing resources to operate), additional computing resources may be automatically provisioned to the client API 108, 110 for API integration.

Example Methods of API Integration

FIG. 3 illustrates a method 300 for facilitating automatic API integration using the client-side integration instructions of FIG. 1. The method 300 may be performed alone or in combination with the method 400 of FIG. 4 described below. The method 300 may begin at step 302 where it is determined that data 104 is to be sent from a client API 108, 110 to a target API 126, 128. For example, a developer may request that data 104 from the client API 108, 110 be provided to the target API 126, 128.

At step 304, the client-side integration instructions 112 determines whether the target device 122 or the target API 126, 128 are authenticated to receive the data 104 to be transferred. For example, the device 122 may be operated by a known user (e.g., determined from login credentials). If the known user is not an authorized user, the authentication may be failed. The client-side integration instructions 112 may determine a network on which the target device 122 operates. If not on an approved network, the target device 122 is not authenticated. The client-side integration instructions 112 may determine whether appropriate security tools are functioning at the target device and/or the target APIs 126, 128. If one or more of these conditions are not met, authentication may fail at step 304. If authentication fails at step 304, the method 300 generally ends, and the data 104 is not transferred. Otherwise, if authentication conditions are satisfied at step 304, the method 300 proceeds to step 306.

At step 306, the client-side integration instructions 112 check the target configuration 120. For example the client-side integration instructions 112 may collect or receive properties 132 of the software/APIs 126, 128 of the target device 122. For instance, the client-side integration instructions 112 may determine that the target API 126, 128 is configured to receive data in a particular data transfer language (e.g., JSON, XML, or the like). As another example, the client-side integration instructions 112 may collect or receive properties 134 of the hardware of the target device 122 or the computing resources allocated to target APIs 126, 128. For example, the client-side integration instructions 112 may determine that the data 104 should be sent in a certain number of segments (e.g., or packets) of a predefined file size (e.g., in a certain number of API calls) and/or at a certain data transfer rate that is commensurate with the data processing and/or network bandwidth properties of the target device 122 and/or target API 126, 128.

At step 308, the client-side integration instructions 112 determine, based on the configuration 120 checked at step 306, if the target API 126, 128 can be integrated with the client API 108, 110. The client-side integration instructions 112 may also or alternatively determine, based on the hardware properties 134 and/or the software properties 132, whether the target API 126, 128 has sufficient computing resources to use (e.g., to receive, display, and/or analyze) the data 104 to be transferred. If the target device 122 and/or the target API 126, 128 lacks sufficient resources for the intended use of the data 104, then the client-side integration instructions 112 may determine that the APIs 108, 110 and 126, 128 cannot be integrated without changes. As another example, if the data transfer language used by the client API 108, 110 cannot be modified, then the client-side integration instructions 112 may determine appropriate target side adjustments to perform (e.g., an appropriate reconfiguration of the target API 126, 128 to indicate in the reconfiguration request 136 of FIG. 1). The client-side instructions 112 may determine, based on the software properties 132, whether the data transfer language used by the client API 108, 110 matches that used by the target API 126, 128. If the data transfer languages do not match, the client-side integration instructions 112 may determine that the APIs 108, 110 and 126, 128 cannot be integrated without target-side adjustments.

Generally if the conditions at step 308 are not met, the client-side integration instructions 112 may send a request 136 to adjust the target device 122 and/or the target API 126, 128 at step 310. For example, if the target device 122 and/or the target API 126, 128 is determined to lack sufficient computing resources for the intended use of the data 104 at step 308, then the instructions may include hardware requirements 118, which include an indication that additional computing resources (e.g., processing, memory, and/or network bandwidth) should be automatically allocated to the target device 122 and/or the target API 126, 128. FIG. 4 describes an example method 400 for using the request 136 to modify the configuration of the target device 122 and/or the target API 126, 128.

If the conditions at step 308 are not met, the client-side integration instructions 112 proceed to step 312 to determine client-side changes which would facilitate improved transfer of the data 104. For example, the client-side integration instructions 112 may determine, based on the software properties 132, whether the data transfer language used by the client API 108, 110 matches that used by the target API 126, 128 (e.g., if the language of the target API 126, 128 cannot be changed or it is preferable to change the language of the client API 108, 110). If the transfer languages do not match, then the client-side integration instructions 112 may determine that changes are needed. The client-side integration instructions 112 may also or alternatively determine whether the client API 108, 110 has sufficient computing resources to provide the data 104 (e.g., to facilitate transfer of a data stream at a predetermined transfer rate). If the client API lacks sufficient computing resources to provide the data 104, then the client-side integration instructions 112 may determine that changes are needed. The client-side integration instructions 112 may also or alternatively determine, based on the software/API properties 132 and/or the hardware properties 134, whether the data 104 can be transferred in the current default call format (e.g., as a single API call). If this is not the case, then the client-side integration instructions 112 may determine that changes are needed.

If it is determined at step 312 that changes to the client configuration are needed, the client-side integration instructions 112 proceed to step 314 to adjust the parameters of the client API 108, 110 as appropriate. For example, If the transfer languages do not match, then the data transfer language used by the client API 108, 110 may be changed to match that of the target API 126, 128. If the client API lacks sufficient computing resources to provide the data 104, additional computing resources (e.g., processing, memory, and/or network bandwidth) may be allocated to the client API 108, 110. If the data 104 cannot be transferred in the current default call format (e.g., as a single API call), then the call format may be appropriately adjusted. For instance, the data 104 may be transferred in multiple API calls. If data 104 is to be transferred from multiple client APIs 108, 110, the API calls needed for this transfer may be automatically compiled to generate a composite API 116. This composite API may subsequently be used for transfer of data 104 to the target API 126, 128. At step 316, the data 104 is generally sent to the target API 126, 128 (e.g., using network 138). Sending data 104 at step 136 may involve splitting the data 104 into an appropriate number of segments or packets and sending the segments of data 104 in a corresponding number of API calls via network 138. For example, portions of the data 104 may be partitioned into one or more API calls, which are transferred to the target API 126, 128.

FIG. 4 illustrates a method 400 for facilitating automatic API integration using the target-side integration instructions 130 of FIG. 1. The method 400 may be implemented based on a reconfiguration request 136 provided by the client device 102, as described above or, in some cases, may be implemented automatically by the target device 122 without prompting from the client device 102. The method 400 may begin at step 402 where instructions are received or identified to implement changes to the target API 126, 128 and/or the target device 122. For example, the target device 122 may receive a reconfiguration request 136 determined by the client-side integration instructions 112 which is used to adjust the target configuration 120 in order to achieve API integration.

As described with respect to FIG. 1, the reconfiguration request 136 may include data properties 114 (e.g., size of file(s) associated with the data 104, transfer rate of the data 104, format of the data 104, data transfer language used to send the data 104, and the like). The target-side integration instructions 130 may use the data properties 114 to determine that a change to the target configuration 120 is needed based. For instance, the target-side integration instructions 130 may determine that a data transfer language used by the target API 126, 128 should be changed to match a data transfer language associated with the data properties 114. As another example, the target-side integration instructions 130 may determine, based on a data file size indicated by the data properties 114, that additional computing resources (e.g., processing nodes, memory, network bandwidth) are needed to receive and/or use the data 104.

As also described with respect to FIG. 1, the reconfiguration request 136 may include hardware requirements 118 (e.g., compute or processing resources needed by the target API 126, 128 to receive and/or use the data 104, memory needed by the target API 126, 128 to receive and/or use the data 104, and/or network bandwidth needed by the target API 126, 128 to receive and/or use the data 104). The target-side integration instructions 130 may use the hardware requirements 118 to determine a change to the target configuration that is needed to receive and/or use the data 104. For instance, the target-side integration instructions 130 may determine, based on the hardware requirements 118, that additional computing resources, (e.g., processing nodes, memory, network bandwidth) are needed to receive the data 104 and/or display an output generated by the application 124 using the data 104.

At step 404, the target-side integration instructions 130 adjust the target API 126, 128 and/or the target device 122 according to the instructions from step 402. For example, if the target-side integration instructions 130 determine at step 402 that a data transfer language used by the target API 126, 128 should be changed to match a data transfer language associated with the data properties 114, the target API 126, 128 (e.g., the configuration of the target API 126, 128) may be automatically adjusted to use this data transfer language. As another example, if the target-side integration instructions 130 determine that additional computing resources (e.g., processing nodes, memory, network bandwidth) are needed to receive and/or use the data 104, the target-side integration instructions 130 may automatically allocate these resources to the target API 126, 128. At step 406, the target-side integration instructions 130 may send a confirmation to the client API 108, 110 that adjustments are complete and that the data 104 may now be transferred.

Example Device for API Integration

FIG. 5 is an embodiment of a device 500 configured to implement components of the system 100. A device 500 may be used to implement the client device 102 of FIG. 1. A device 500 may be used to implement the target device 122 of FIG. 1. In cases in which the client device 102 and/or the target device 122 is a server, two or more of the devices 500 may be used to implement the server. The device 500 includes a processor 502, a memory 504, and a network interface 506. The device 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504 and the network interface 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 200 of FIG. 2 and the flowcharts 300 and 400 of FIGS. 3 and 4. In some embodiments, the function described herein is implemented using logic units, FPGAs, ASICs, DSPs, or any other suitable hardware or electronic circuitry.

The memory 504 is operable to store any of the information described above with respect to FIGS. 1-4 along with any other data, instructions, logic, rules, or code operable to execute the function described herein. For example, the memory 504 may store the data 104, client-side integration instructions 112, data properties 114, hardware requirements 118, target configuration 120, client-side integration instructions 130, software/API properties 132, hardware properties 134, and/or reconfiguration request 136 described above with respect to FIGS. 1-4. The memory may also store API instructions 508, which include any logic, code, and/or rules for implementing the various APIs 108, 110, 126, 128, described above with respect to FIGS. 1-4. The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM).

The network interface 506 is configured to enable wired and/or wireless communications. The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
   a target device comprising a processor configured to execute a target application programming interface (API); and
   a client device comprising a processor configured to:
      execute a first client API, wherein the first client API is configured to collect data from a data source;
      determine that at least a portion of the data collected by the first client API is to be sent from the first client API to the target API;
      in response to determining that the portion of the collected data is to be sent from the first client API to the target API:
         receive target configuration information comprising one or both of software properties of software executed on the target device and hardware properties of the target device, wherein the software properties are associated with one or more tasks to be performed by the target API, wherein the hardware properties include a measure of computational resources allocated to the target API;
         determine, based on the target configuration information, that a data transfer change is needed for receipt of the portion of the data by the target API, wherein the data transfer change comprises one or more of a change to the portion of data to be transferred, a configuration of the first client API, and a configuration of the target API; and
         in response to determining that the data transfer change is needed for receipt of the portion of the data by the target API, automatically implement the data transfer change; and
         following implementation of the data transfer change, send the portion of the data to the target API.

2. The system of claim 1, wherein:
   the data transfer change is a change to a data transfer language used by the first client API to send the portion of the data; and
   the processor of the client device is further configured to determine that the data transfer change is needed by:
      identifying, based on the target configuration information, a first data transfer language associated with the target API;
      identifying a second data transfer language associated with the first client API; and
      determining that the first data transfer language is not the same as the second data transfer language.

3. The system of claim 1, wherein:
   the first change to the data comprises a partitioning of the portion of the data into two or more API calls to be transferred to the target API; and
   the processor of the client device is further configured to determine that the first change to the portion of the data is needed for receipt of the portion of the data by the target API by:
      determining, based on the target configuration information, a maximum file size that can be received by the target API; and
      determining the maximum file size is greater than a file size associated with the portion of the data.

4. The system of claim 1, wherein the processor of the client device is further configured to:
   execute a second client API, wherein the second client API is configured to collect a second portion of data; and
   automatically allocate API calls associated with the first client API and the second client API, thereby generating a composite API.

5. The system of claim 1, wherein the processor of the client device is further configured to:

determine, based on the software properties, an anticipated use for the portion of the data by the target API;
determine anticipated hardware requirements for achieving the anticipated use of the portion of the data by the target API;
compare the anticipated hardware requirements to the computational resources allocated to the target API;
determine, based on the comparison of the anticipated hardware requirements to the computational resources allocated to the target API, that additional resources should be allocated to the target API; and
in response to determining that the computing capacity of the target device does not satisfy an anticipated computing capacity threshold, send a request to allocate the additional resources to the target API.

6. The system of claim 5, wherein the processor of the target device is further configured to:
receive the request to allocate the additional resources to the target API; and
in response to receiving the request, automatically allocate the additional resources to the target API.

7. The system of claim 1, wherein the processor of the client device is further configured to, prior to sending the portion of the data, determine that the target device is authenticated to receive the data.

8. The system of claim 1, wherein the processor of the client device is further configured to:
determine a data transfer rate associated with the collection of the data by the first client API is greater than a threshold value; and
in response to determining that the data transfer rate associated with the collection of the data by the first client API is greater than the threshold value, automatically provision additional computing resource to the first client API.

9. A method comprising:
executing a first client application programming interface (API), wherein the first client API is configured to collect data from a data source;
determining that at least a portion of the data collected by the first client API is to be sent from the first client API to a target API executed on a target device;
in response to determining that the portion of the collected data is to be sent from the first client API to the target API:
receiving target configuration information comprising one or both of software properties of software executed on the target device and hardware properties of the target device, wherein the software properties are associated with one or more tasks to be performed by the target API, wherein the hardware properties include a measure of computational resources allocated to the target API;
determining, based on the target configuration information, that a data transfer change is needed for receipt of the portion of the data by the target API, wherein the data transfer change comprises one or more of a change to the portion of data to be transferred, a configuration of the first client API, and a configuration of the target API; and
in response to determining that the data transfer change is needed for receipt of the portion of the data by the target API, automatically implementing the data transfer change; and
following implementation of the data transfer change, sending the portion of the data to the target API.

10. The method of claim 9, wherein:
the data transfer change is a change to a data transfer language used by the first client API to send the portion of the data; and
the method further comprises determining that the data transfer change is needed by:
identifying, based on the target configuration information, a first data transfer language associated with the target API;
identifying a second data transfer language associated with the first client API; and
determining that the first data transfer language is not the same as the second data transfer language.

11. The method of claim 9, wherein:
the first change to the data comprises a partitioning of the portion of the data into two or more API calls to be transferred to the target API; and
the method further comprises determining that the first change to the portion of the data is needed for receipt of the portion of the data by the target API by:
determining, based on the target configuration information, a maximum file size that can be received by the target API; and
determining the maximum file size is greater than a file size associated with the portion of the data.

12. The method of claim 9, wherein the method further comprises:
executing a second client API, wherein the second client API is configured to collect a second portion of data; and
automatically allocating API calls associated with the first client API and the second client API, thereby generating a composite API.

13. The method of claim 9, wherein the method further comprises:
determining, based on the software properties, an anticipated use for the portion of the data by the target API;
determining anticipated hardware requirements for achieving the anticipated use of the portion of the data by the target API;
comparing the anticipated hardware requirements to the computational resources allocated to the target API;
determining, based on the comparison of the anticipated hardware requirements to the computational resources allocated to the target API, that additional resources should be allocated to the target API; and
in response to determining that the computing capacity of the target device does not satisfy an anticipated computing capacity threshold, sending a request to allocate the additional resources to the target API.

14. The method of claim 13, wherein the method further comprises:
receiving the request to allocate the additional resources to the target API; and
in response to receiving the request, automatically allocating the additional resources to the target API.

15. The method of claim 9, wherein the method further comprises, prior to sending the portion of the data, determining that the target device is authenticated to receive the data.

16. The method of claim 9, wherein the method further comprises:
determining a data transfer rate associated with the collection of the data by the first client API is greater than a threshold value; and
in response to determining that the data transfer rate associated with the collection of the data by the first client API is greater than the threshold value, automatically provisioning additional computing resource to the first client API.

17. A device comprising a processor configured to:
execute a first client API, wherein the first client API is configured to collect data from a data source;
determine that at least a portion of the data collected by the first client API is to be sent from the first client API to a target API executed on a target device;
in response to determining that the portion of the collected data is to be sent from the first client API to the target API:
 receive target configuration information comprising one or both of software properties of software executed on the target device and hardware properties of the target device, wherein the software properties are associated with one or more tasks to be performed by the target API, wherein the hardware properties include a measure of computational resources allocated to the target API;
 determine, based on the target configuration information, that a data transfer change is needed for receipt of the portion of the data by the target API, wherein the data transfer change comprises one or more of a change to the portion of data to be transferred, a configuration of the first client API, and a configuration of the target API; and
 in response to determining that the data transfer change is needed for receipt of the portion of the data by the target API, automatically implement the data transfer change; and
 following implementation of the data transfer change, send the portion of the data to the target API.

18. The device of claim 17, wherein:
the data transfer change is a change to a data transfer language used by the first client API to send the portion of the data; and
the processor is further configured to determine that the data transfer change is needed by:
 identifying, based on the target configuration information, a first data transfer language associated with the target API;
 identifying a second data transfer language associated with the first client API; and
 determining that the first data transfer language is not the same as the second data transfer language.

19. The device of claim 17, wherein:
the first change to the data comprises a partitioning of the portion of the data into two or more API calls to be transferred to the target API; and
the processor is further configured to determine that the first change to the portion of the data is needed for receipt of the portion of the data by the target API by:
 determining, based on the target configuration information, a maximum file size that can be received by the target API; and
 determining the maximum file size is greater than a file size associated with the portion of the data.

20. The device of claim 17, wherein the processor is further configured to:
determine, based on the software properties, an anticipated use for the portion of the data by the target API;
determine anticipated hardware requirements for achieving the anticipated use of the portion of the data by the target API;
compare the anticipated hardware requirements to the computational resources allocated to the target API;
determine, based on the comparison of the anticipated hardware requirements to the computational resources allocated to the target API, that additional resources should be allocated to the target API; and
in response to determining that the computing capacity of the target device does not satisfy an anticipated computing capacity threshold, send a request to allocate the additional resources to the target API.

* * * * *